United States Patent [19]

Myers

[11] Patent Number: 4,526,600
[45] Date of Patent: Jul. 2, 1985

[54] METHOD FOR THE LUBRICATION OF DELIVERY EQUIPMENT AND MOLDS USED IN PRODUCTION OF GLASS ARTICLES

[75] Inventor: Ronald T. Myers, Brockway, Pa.
[73] Assignee: Brockway, Inc., Brockway, Pa.
[21] Appl. No.: 461,544
[22] Filed: Jan. 27, 1983
[51] Int. Cl.³ .............................................. C03B 40/02
[52] U.S. Cl. ............................................ 65/24; 65/26; 65/25.1
[58] Field of Search ................... 65/24, 26, 25.1, 208; 427/27, 423, 189; 252/29; 425/94; 264/130

[56] References Cited

U.S. PATENT DOCUMENTS

| | | | |
|---|---|---|---|
| 1,415,824 | 5/1922 | Ferngren . | |
| 3,052,629 | 9/1962 | Morrow et al. | 252/29 |
| 3,141,752 | 7/1964 | Keller . | |
| 3,264,077 | 8/1966 | Bishop | 65/24 |
| 3,442,748 | 5/1969 | D'Huart | 65/24 |
| 3,672,860 | 6/1972 | Keller | 65/24 |
| 3,857,691 | 12/1974 | Jones et al. | 65/25.1 |
| 3,874,862 | 4/1975 | Bickling, Jr. et al. | 252/29 |
| 3,988,137 | 10/1976 | Goodwin | 65/26 |
| 4,351,789 | 9/1982 | Sidles et al. | 264/130 |

FOREIGN PATENT DOCUMENTS 42301  9/1962  Luxembourg .

Primary Examiner—William F. Smith
Assistant Examiner—Michael K. Boyer
Attorney, Agent, or Firm—Burns, Doane, Swecker & Mathis

[57] ABSTRACT

An improved method is provided for the lubrication of molds and delivery equipment which are employed in the production of glass articles wherein the viscous glass which is employed in the production of such articles is at least partially coated with a suitable lubricant prior to contact with the delivery equipment and/or prior to entry of the glass into the mold.

23 Claims, 6 Drawing Figures

METHOD FOR THE LUBRICATION OF DELIVERY EQUIPMENT AND MOLDS USED IN PRODUCTION OF GLASS ARTICLES

BACKGROUND AND OBJECTS OF THE INVENTION

The present invention is directed to the lubrication of delivery equipment and glass molds during the manufacture of molded glass articles.

In manufacturing molded glass articles, molten (i.e., viscous) glass is introduced into a mold of suitable configuration. The viscous glass is subsequently caused to conform to the shape of the internal surface of the mold and hardens. It is known in the art of glass article manufacturing that the presence of a lubricant between the glass and the mold is highly desirable to overcome the adherent characteristics of the viscous glass and to allow the glass to slide over the mold surface. Further, the lubricant facilitates the removal of the hardened glass article from the mold.

Traditionally, such molds have been lubricated by the application of a carbonaceous liquid called "swab dope" directly onto the interior surface of the mold prior to the introduction of the viscous glass. In operation, a lubricating device such as a lubricant spray means or a brush adapted to apply the lubricant is positioned adjacent to a glass article-forming station which may include several molds of identical configuration. The internal surfaces of the molds are lubricated with the lubricant (i.e., swab dope) prior to being filled with viscous glass after 50 to 250 pieces of glass have been processed. After the glass has hardened and the article thus formed removed, the swab dope either remains on the interior surface of the mold (retaining some of its lubricating characteristics for the next glass-filling operation) or is ultimately burnt off by contact with the viscous glass unless replenished by relubrication as above.

As an alternative to lubrication, semi-permanent mold precoatings have been applied to the molds. The precoatings function as a lubricant in facilitating the sliding of viscous glass over the metal surface of the mold.

A known device for delivering viscous glass to a mold is described in U.S. Pat. No. 3,672,860 (issued to Keller). As disclosed therein, a gob of viscous glass is initially shaped to conform to the mold while falling through a funnel mechanism toward the mold. The funnel mechanism includes an arrangement for spraying an internal surface of the mold with a lubricant prior to introduction of the viscous glass into the mold. In one embodiment of the device disclosed therein, the sequence of operation for lubricating the mold may be timed such that the lubricant spray incidentally impinges on an outside surface of the glass gob as the gob enters the mold while primarily lubricating the interior surface of the mold. Thus, in that particular embodiment of Keller, the internal surface of the glass mold and the external surface of the glass gob may be simultaneously lubricated after the gob has at least partially entered the mold.

Several problems, however, exist when molds are lubricated in the above-identified manner. Generally, a mold must be prepared to receive the viscous glass in an assembly line-type of process. On an Individual Section (I.S.) machine, the glass gob is introduced into a blank and then formed into a parison. A transfer arm flips the parison, and the parison is blown to conform to the shape of the final mold. A hardened glass product is then removed from the final mold. In other glass product manufacturing machines, a mold is conveyed into a position for receiving a glass gob. The glass-filled mold is then removed and a new mold is positioned to receive a subsequent glass gob.

If a particular cycle of the I.S. machine or other glass manufacturing machine is programmed for swabbing the molds, precise timing is required in order to lubricate the mold prior to the entry of the viscous glass. Problems associated with the precise timing for the mold lubrication are compounded in prior art lubrication methods which lubricate the mold before each glass-filling operation. Thus, a mold which was adequately lubricated for a first viscous glass-filling operation may be relubricated before a second viscous glass-filling operation, even if the mold does not require additional lubrication.

Further, a lubrication device, if employed, must be positioned near the mold. The close proximity of the lubrication device to the mold results in cramped quarters. The operator is exposed to heat, noise, fumes and moving machinery during swabbing. This problem becomes especially acute in operations in which the filled mold is to be conveyed away from the glass article-forming station.

The amount of lubricant applied to the mold must also be monitored in such operations. If an insufficient amount of lubricant is applied to the mold, the glass may stick to the internal surface of the mold. Such sticking may result in damage to the mold and the production of an article having an imperfect shape and/or exterior surface. If an excessive amount of lubricant is applied, a black residue of the lubricant may appear on the surface of the glass product. Such residue of lubricant on a glass article is unsightly and thus decreases the value and quality of the article. In addition, vapors from the lubricant form black deposits on other parts of the glass-forming apparatus.

OBJECTS AND SUMMARY OF THE PRESENT INVENTION

It is therefore an object of the present invention to provide a lubricating technique wherein the need for precise timing in lubricating a glass mold is eliminated.

A further object of the present invention is to provide a lubricating process wherein a mold may be intermittently lubricated with greater ease.

A further object of the present invention is to reduce the space limitations near the glass-forming apparatus by lubrication of the viscous glass at a point distant from the glass mold.

A further object of the present invention is to provide a lubricating process wherein the amount of lubricant applied to the mold is uniform and capable of being easily monitored.

A further object of the present invention is to reduce the amount of fumes resulting from known lubrication methods.

A further object of the present invention is to reduce the exposure of the operator to excessive heat, noise, fumes and moving machinery.

A further object of the present invention is to eliminate the necessity of semi-permanent mold precoatings for the purpose of lubrication.

A further object of the present invention is to provide a lubricating process for the lubrication of viscous glass delivery equipment used in the production of glass articles.

In accordance with the present invention, there is thus provided a method for the production of glass articles wherein viscous glass is provided, caused to be placed in a mold of a suitable configuration and permitted to cool to form a glass article, the improvement comprising applying a lubricant to the surface of said viscous glass prior to entry of said viscous glass in said mold.

In accordance with the present invention, there is also provided a method for the production of glass articles wherein viscous glass gobs are provided, caused to be placed in a mold of suitable configuration and permitted to cool to form a glass article, the improvement comprising coating at least a portion of said glass gobs prior to entry thereof in said mold by causing at least a portion of said glass gobs to pass through at least one flame having entrained therein a particulate lubricant whereupon said lubricant adheres to said gobs.

In accordance with the present invention, there is also provided a method for the production of glass articles wherein viscous glass is provided and directed by delivery equipment, the improvement comprising lubricating the glass prior to contact with the delivery equipment by applying a lubricant to the surface of the viscous glass prior to said contact.

BRIEF DESCRIPTION OF THE DRAWINGS

The present invention will be hereinafter described with reference to the following figures, wherein.

DETAILED DESCRIPTION OF THE INVENTION

In accordance with the present invention, it has been surprisingly found that a mold used in the production of glass articles from viscous glass as well as the delivery equipment used in such production may be lubricated by application of a lubricant to the viscous glass prior to contact of the glass with the delivery equipment and/or prior to introduction of the glass into the mold. The lubricant may be applied to the glass at any convenient location in the glass article-manufacturing process prior to contact of the glass with the delivery equipment or prior to introduction of the glass into the mold. Any known device for application of the lubricant may be employed to apply the lubricant to the viscous glass. For purposes of the present invention, the term "mold" is intended to denote any object which contacts the glass to which the glass is intended to conform in shape. For example, the term mold is intended to include within its scope but not be limited to blanks and final molds. For purposes of the present invention, the term "delivery equipment" is intended to include within its scope but not be limited to chutes, funnels, belts, etc.

Figure 1:
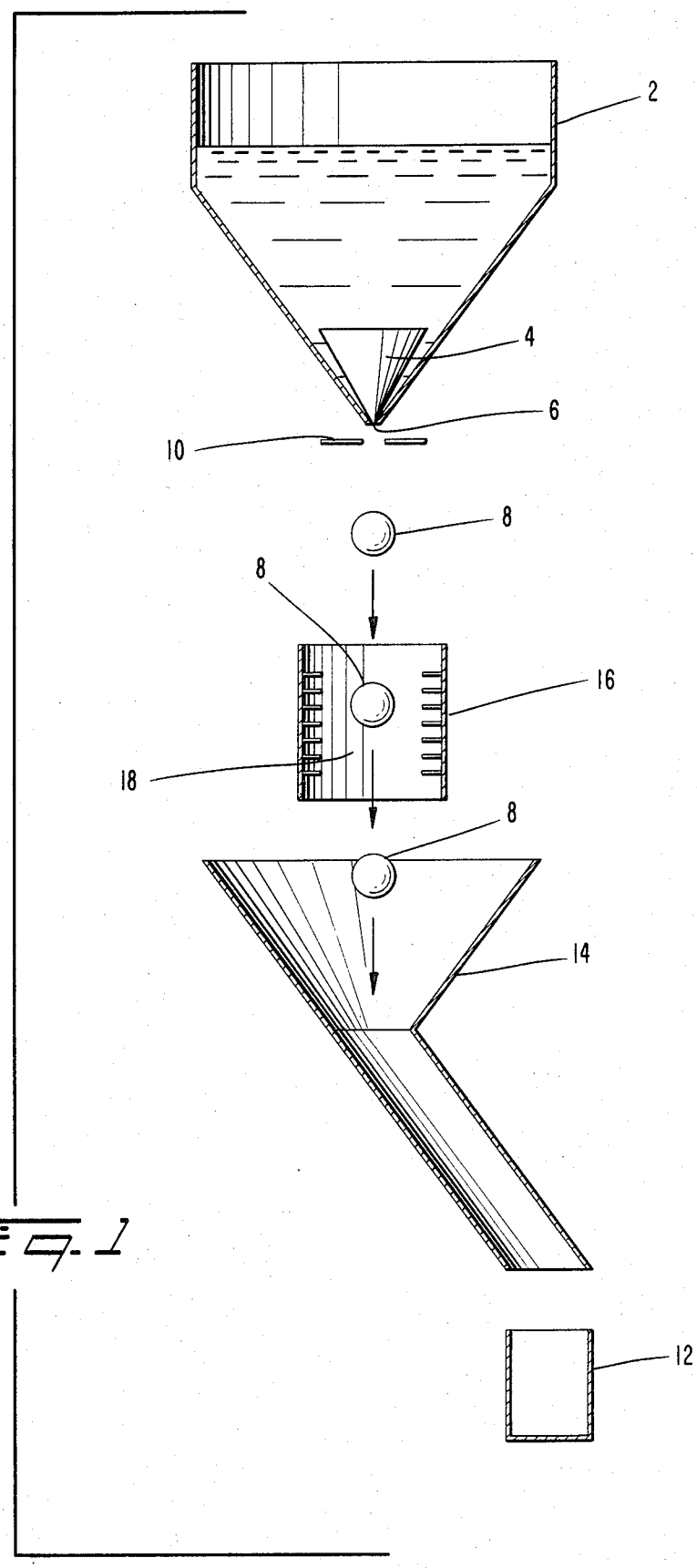
FIG. 1 depicts a schematic representation of the glass article-forming apparatus employed in the method of the present invention.

A schematic representation of the glass article-forming method is depicted in FIG. 1 and the invention will be described with reference thereto. Viscous glass from a glass melting furnace or other suitable source is contained within a reservoir denoted as a forehearth or a feeder. Viscous glass is forced from the forehearth 2 by a feeder mechanism 4 located near the base of the forehearth 2. The feeder mechanism forces glass out of an orifice 6 in the base of the forehearth 2 by suitable means such as a reciprocating plunger or needle which alternately draws glass into the orifice area on its upward stroke and forces viscous glass down through the orifice 6 on its downward stroke. The mass of viscous glass is then cut into separate gobs 8 of desired precise weight by a shearing mechanism 10 located below the orifice 6.

The viscosity of the viscous or molten glass is controlled by adjusting the temperature of the viscous glass so that the glass is neither too viscous to drop from the orifice nor too liquid so that it runs from the orifice. Specifically, the viscosity will preferably range from about $10^3$ to $10^5$ poise and most preferably about $10^{3.5}$. For example, for soda lime glasses, the temperature of the viscous glass will generally range from about 1800° to 2200° F.

Upon being formed, each gob 8 is permitted to fall toward a mold 12 (a distance generally of at least several feet). A series of delivery chutes 14, only one of which is illustrated, receives each gob 8 and conveys it toward a mold. A mold 12 which occupies a filling position beneath the chute receives the gob 8 upon its exit from the chute 14.

Conventional exemplary methods and apparatus for discharging a glass gob from a forehearth and conveying the same to a mold are disclosed in U.S. Pat. Nos. 2,128,249 (issued to Honiss) and 2,185,565 (issued to Pearson), each herein incorporated by reference.

It is noted that while the invention has been in part described by reference to the use of a diagonally oriented chute as shown in FIG. 1, the invention is not limited to either the design of the chute or to the presence of the chute.

According to the present invention, a lubricant may be applied to the glass gob 8 prior to the introduction of the glass gob into the mold 12. Thus, a lubricating means 16 is positioned between the orifice 6 at the bottom of the forehearth 2 and the mold 12. Preferably, the application of lubricant to the glass gob occurs as the gob 8 falls between the shearing mechanism 10 and the chute 14 such that the lubricant can also be transferred to the chute.

As shown in FIG. 1, a lubrication means 16 is positioned to lubricate an exterior surface of a falling gob 8 as the gob falls through a coating zone 18 of the lubrication means. The lubrication means may be of any configuration capable of providing the desired lubrication. For example, the means may comprise an annular ring through which the gob falls or a plurality of symmetrically disposed individual devices which direct the lubricant toward the falling gob. In either case, the lubricant should be directed toward the coating zone 18 through which the gobs pass. Preferably, the application of the lubricant should be such that the exterior surface of the falling gob is at least substantially completely coated with the lubricant. Further, the lubrication means 16 should be capable of independent operation and positioned so that the shearing mechanism 10, the feeder mechanism 4 and the chute 14 may be operated independently when the lubrication means is not in operation.

Upon entering the mold or sliding along the delivery equipment, the lubricant which has been applied to the surface of the glass gob is then at least partially transferred from the exterior surface of the gob to the interior surface of the mold or the delivery equipment. There is thus no requirement to separately lubricate the interior of the mold or the delivery equipment since such a result is accomplished by lubrication of the viscous glass by the method of the present invention.

It is noted that the present invention has been described with reference to the preferred embodiment wherein a glass gob is lubricated as the gob falls between the viscous glass reservoir and the mold. The present invention, however, is not limited to lubrication of a falling glass gob. With reference to the I.S. machine, the parison or any other intermediate shape in which the glass is exposed may be lubricated by the lubrication method of the present invention. Reference may be made in this regard to the *Handbook of Glass Manufacture*, Vol. I, edited by F. V. Tooley, Ogden Publishing Co., 1953, pp. 299-388 for various feeding and forming processes.

The objects of the present invention may also be accomplished by lubricating a viscous stream of glass in lieu of lubricating glass gobs. Specifically, the lubrication of a stream of viscous glass as opposed to the lubrication of individual gobs would be desirable in those methods of glass article manufacture wherein gobs per se are not employed. An example of such a method would be the method by which light bulbs are produced by use of the Corning Bulb Machine known in the industry as the ribbon machine. Such a method is described in detail in the previously-noted *Handbook of Glass Manufacture* at pages 356-358, herein incorporated by reference in its entirety. The lubrication of the viscous glass stream in such a method serves the additional purpose of enhancing the lubricity of the glass as it contacts the moving belt employed therein as well as to enhance the lubricity of the glass with respect to the blow mold. A portion of the lubricant is also transferred to the belt.

Figure 2:
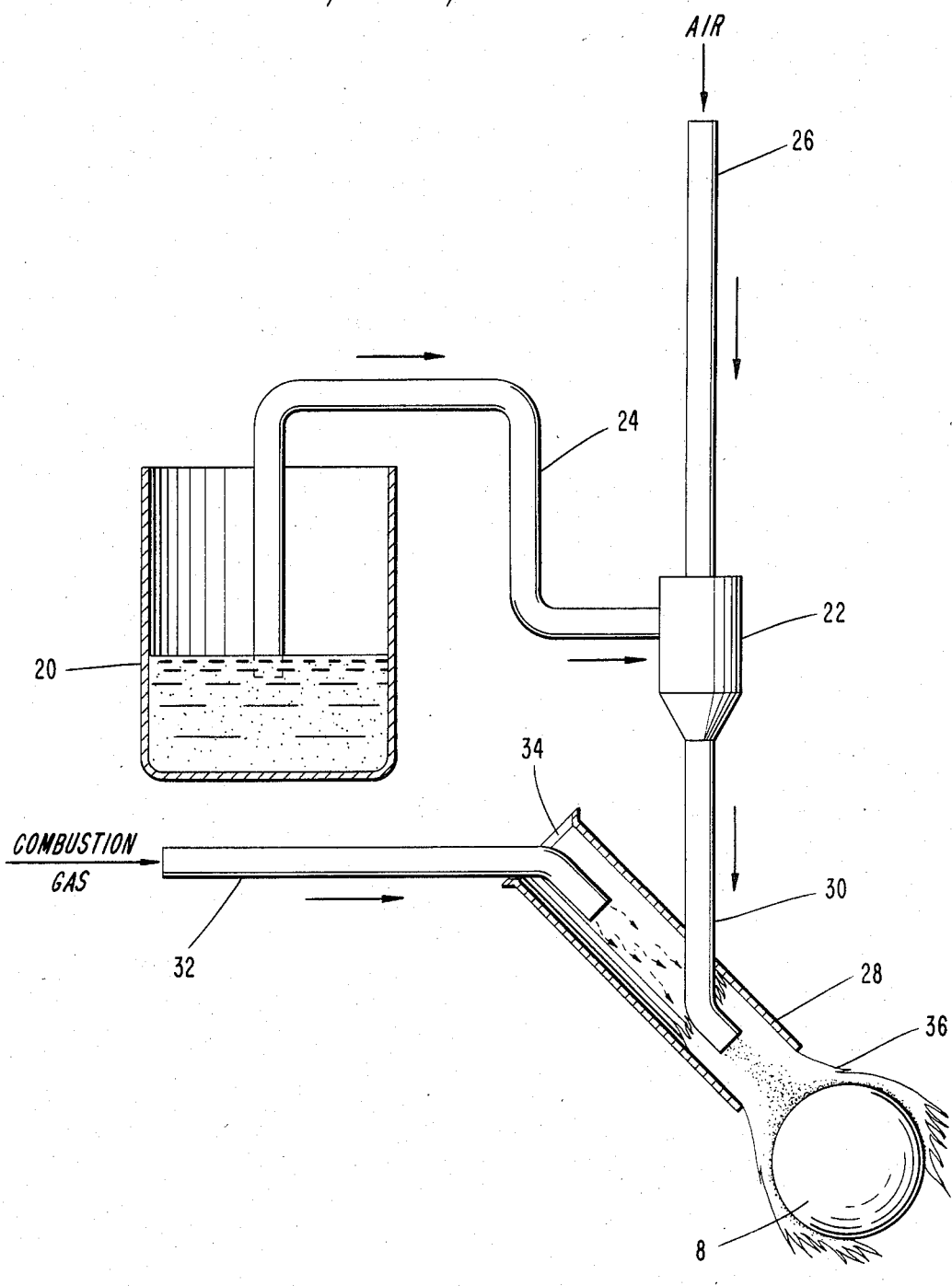
FIG. 2 depicts a further embodiment of the present invention.

A preferred embodiment of the present invention is illustrated in FIG. 2 wherein the lubricant in the form of a powder (e.g., powdered graphite) is applied to the viscous glass by means of a flame spray lubrication means. In operation, powdered graphite is introduced into a nozzle of a burner together with combustion gases for the flame. The burner is positioned such that the outer cone of the flame impinges on an exterior surface of the glass gob as the gob falls toward the mold. The graphite powder (fed to the interior of the flame) contacts the viscous glass and adheres thereto by means of electrical charges accumulated by the graphite as it passes through the flame. In addition, it is believed although not yet verified that various chemical radicals produced in the flame contribute to the adhesion of the graphite to the glass.

More specifically, powdered graphite may be entrained in a fluidized bed 20 having sufficient fluidizing action to prevent the powder from caking. A vacuum induced by venturi 22 draws the powdered graphite from the fluidized bed 20 through a feed tube 24. Air from an air feed tube 26 and the graphite from the fluidized bed 20 are admixed and directed to burner 28 by feed tube 30 while burner 28 is also fed with a combustion gas (e.g., acetylene or methane) from a conduit 32 together with air from a natural draft intake 34. The burner 28 may use natural gas with a combination of a natural draft and forced air feed. When the powdered lubricant is sprayed, the flame may use both the air from the natural draft inlet 34 and the air from the air feed tube 26.

The powder is entrained in the interior of the flame 36 whereupon it adheres to falling gobs upon contacting the gobs. The powder is believed to adhere to the gobs as a result of the powder becoming ionized within the flame. Preferably, a plurality of burners aimed radially inward are symmetrically disposed around the coating zone to insure that the graphite is applied to substantially the entire exterior surface of the gobs. For example, three burners may be symmetrically positioned at 120° intervals to ensure uniform application. Alternatively, a single fluidized bed with multiple graphite feed tubes may be used to supply the burners. In addition, valves may be incorporated into the air feed line 26 and the natural gas conduit 32 to control the relative proportion of lubricant, air and natural gas.

Figure 3:
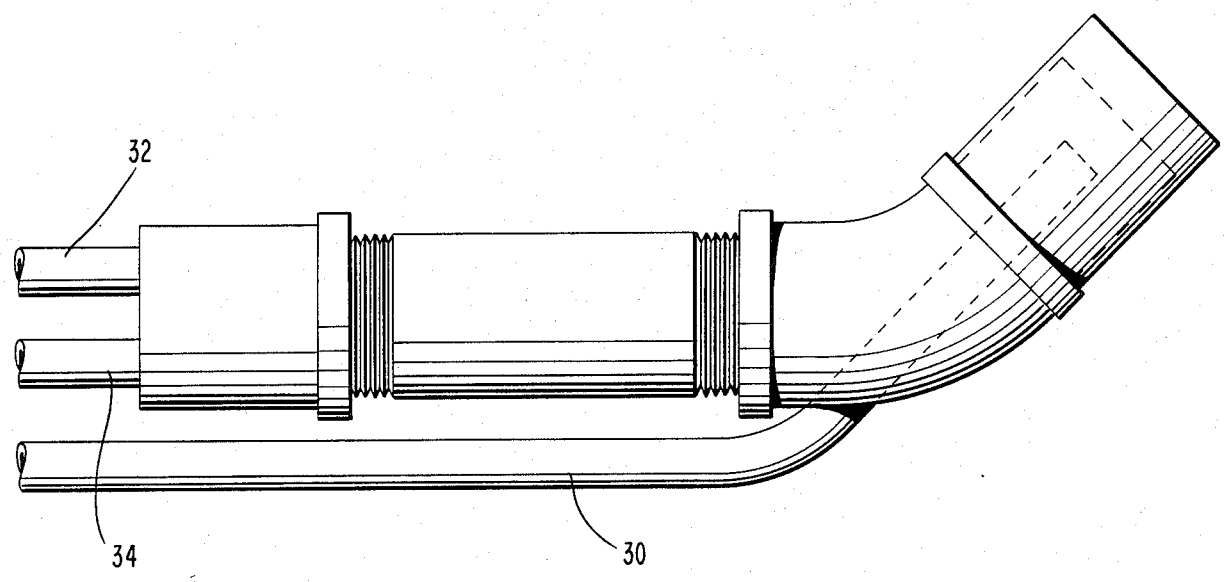
FIG. 3 depicts in detail a flame spray unit of the embodiment of FIG. 2.

A detailed view of a flame spray device suitable for use in the present invention is depicted in FIG. 3. The device comprises natural gas feed means 32, air intake means 34 and lubricant (e.g., graphite) feed means 30. The lubricant feed means comprises ¼ inch I.D. pipe which is inserted into a 1 inch I.D. pipe.

Figure 4:
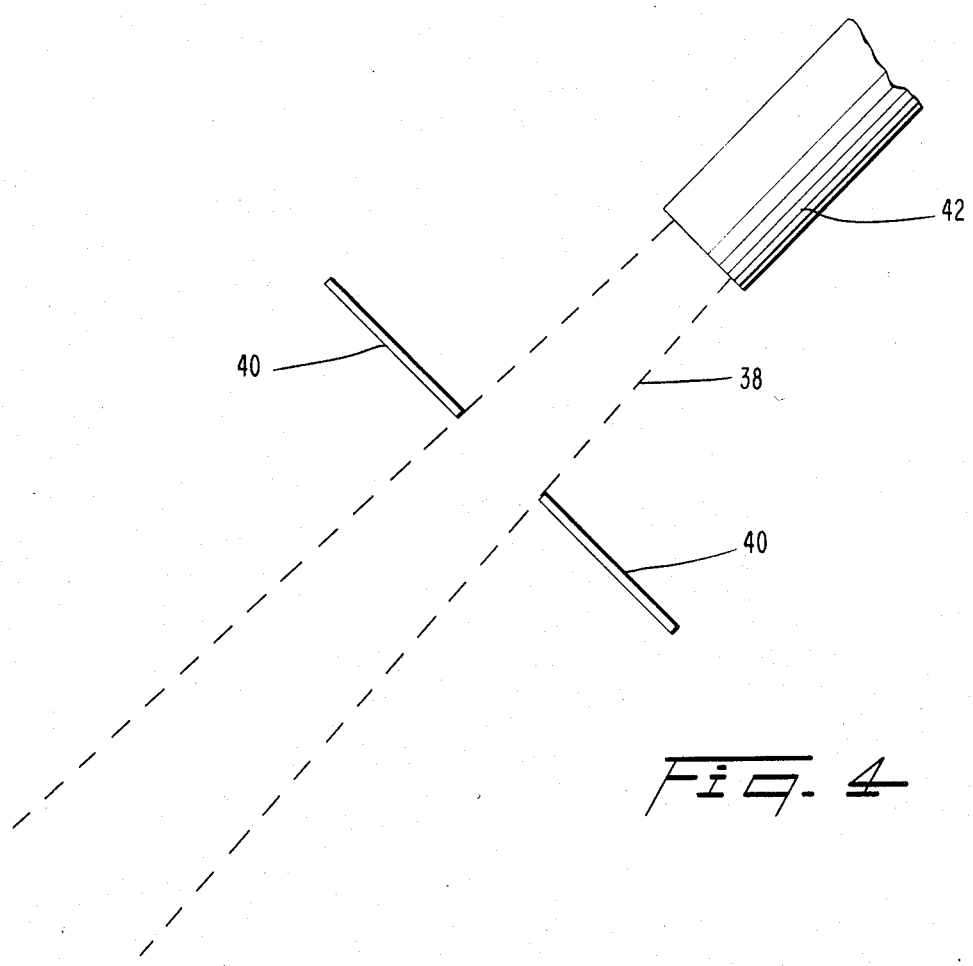
FIG. 4 depicts an additional embodiment of the present invention.

Another embodiment of the present invention is illustrated in FIG. 4 wherein the powdered lubricant is applied to the viscous glass by means of an electrostatic spray lubrication device. In operation, graphite powder (depicted as the dashed line 38) is directed past electrodes 40 maintained at an electrical potential of 10 kv or more. The graphite powder 38 is charged as it passes the electrodes and then adheres to the glass gobs (not shown) which are contacted by the spray by means of electrostatic forces. Alternatively, the glass may be charged by means of a high voltage to cause the glass to attract the lubricant powder.

As shown in FIG. 4, graphite particles are mixed with air in a nozzle 42. An air/graphite mixture may be obtained by use of any conventional apparatus or by use of the fluidized bed and air feed venturi system described above with reference to the flame spray lubrication device. Upon being sprayed from the nozzle 42, the air graphite mixture passes between electrodes 40 which electrodes charge the graphite particles. Thus, a stream of charged graphite particles is directed toward the glass gobs which are passing toward the mold and are ultimately coated. Preferably, a plurality of nozzles 42 and electrodes 40 are symmetrically disposed so as to effectively coat the entire surface of the gobs.

Figure 5:
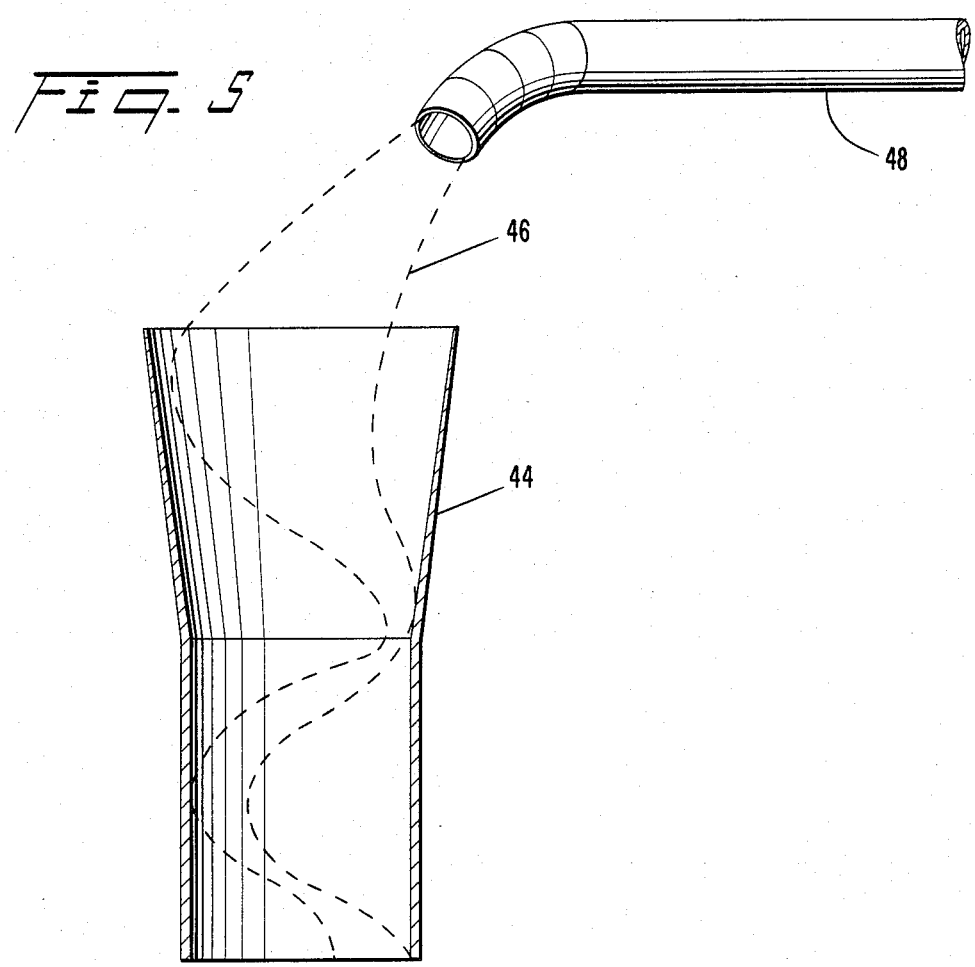
FIG. 5 depicts in detail an additional flame spray embodiment.
Figure 6:
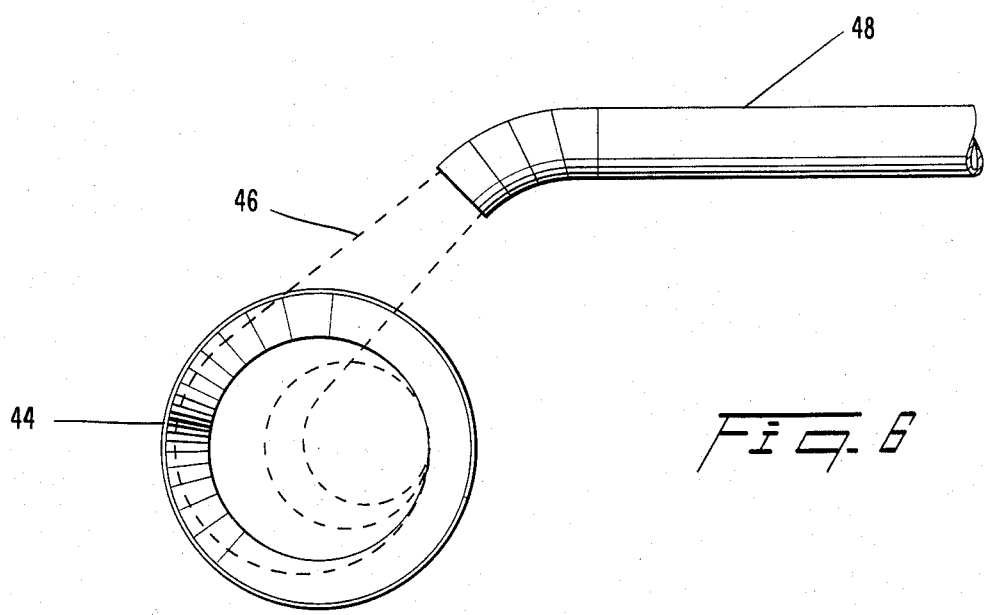
FIG. 6 depicts a top view of the embodiment of FIG. 5.

Another embodiment of the present invention is depicted in FIGS. 5 and 6 wherein glass gobs (not shown) are caused to pass through a funnel 44 by which they are directed to a mold (not shown), with a lubricant-laden flame 46 being directed into the funnel 44 from burner 48 to lubricate the gobs as they pass through the funnel.

Any suitable lubricant may be employed to coat the viscous glass, although particulate or powdered graphite is the preferred lubricant. The use of powdered graphite eliminates formation of the undesirable vapors associated with the use of conventional "swab dope". Further, the use of graphite in powdered form provides for more precise monitoring of the amount of lubricant which is applied to the viscous glass.

Suitable graphite powders which can be employed with success in practice of the invention are available commercially. For example, graphite powders marketed by Superior Graphite Co. denoted as product Nos. 8535 and 9035 are acceptable. Superior Graphite Co. product No. 8535 consists of a natural (mineral) graphite flake having an ash content of less than 2 percent by weight and which is ground to −325 mesh. Additional exemplary graphite powders are available commercially from Asbury Graphite Mills (products 268, 508 and A-99) and Dixon Graphite Co. (product HPN-265). The above-noted graphite powders range in size from −325 to +250 mesh.

It has been found that the frictional properties of mineral graphite can be improved by thermal treatment thereof at temperatures in the range of about 150° C. for several hours in a vacuum furnace (e.g., at 29 inches of mercury gauge). Such heat treatment drives off excess absorbed water present in the graphite.

Powdered inorganic salts such as sodium or potassium sulfate have also been found to provide the desired lubrication effect (i.e., the reduction of the sliding coefficient of friction which exists between the viscous glass and the heated mold surface). The salts appear to form a liquid layer upon the glass upon contact therewith which decreases the frictional properties of the glass.

The use of the flame spray and electrostatic spray devices permit a lubricant such as graphite to be applied in a dry powdered form. Since the surface temperature of the viscous glass may reach approximately 2200° F., the use of conventional oil or water-based lubricants is undesirable due to the volatiles which would be produced upon contacting the viscous glass with the lubricant.

Additionally, it has been surprisingly found that the coating of viscous glass with a lubricant according to the present invention eliminates the need for specifically lubricating the interior surface of a mold before each glass-filling operation. The need to lubricate viscous glass delivery equipment can also be avoided depending upon the point in the glass article production process at which the lubricant is applied. As stated previously, the lubricant which is applied to the viscous glass is at least partially transferred from the external surface of the glass to an internal surface of the mold and/or the delivery equipment. It has been found that the lubricant thus retains some of its lubricating properties even after the hardened glass product has been formed and removed from the mold. Thus, the lubrication method of the present invention provides the additional advantage that each gob entering a particular mold need not be coated with lubricant. Rather, the present invention desirably enables intermittent coating of gobs with lubricant to be employed. It has been found that gobs may be coated with a lubricant in various ways including but not being limited to lightly but continuously providing a coating on gobs or initially providing a heavy coating on the gobs to be coated. For example, in the latter case, every tenth or twentieth gob may be coated with the lubricant and satisfactory results have been obtained when from 1 to 5 percent of the gobs have been lubricated.

The molten glass need only be coated with sufficient lubricant to provide the necessary lubrication for the mold. Preferably, the lubricant (as applied in the form of a powder) is applied to the viscous glass in an amount ranging from about 0.05 milligrams/cm$^2$ to about 2.15 grams/cm$^2$, with the powder generally being applied in an amount of 0.3 milligrams/cm$^2$ (i.e., about 42 milligrams/coated gob).

The invention is additionally illustrated in connection with the following Examples which are to be considered as illustrative of the present invention. It should be understood, however, that the invention is not limited to the specific details of the Examples.

EXAMPLE 1

The lubricating method of the present invention was employed to produce a plurality of 32 ounce bottles of flint (clear) glass at a rate of 37 bottles per minute on a six section, single gob, I.S. machine. Glass was discharged from the forehearth and sheared at the rate of 1.6 seconds per gob to provide gobs with a weight of 20⅜ ounces. The shears were about 2 inches below the forehearth. Each mold was filled at a 9.7 second interval.

The gobs were sprayed with a flame spray lubricating device having three forced air burners located about 4 inches below the shears, each burner having an inside diameter of one inch as depicted in FIG. 3. Graphite was delivered to the burner through the above-described fluidized bed and air feed arrangement.

Graphite was sprayed on the gobs as the gobs passed through the flame, with the amount of graphite sprayed per gob being approximately 0.50 grams (graphite-air feed of approximately 36 SCFH and a gas pressure of approximately 5 pounds per burner). The graphite was sprayed on approximately 50 percent of the gobs. It was observed that the gobs properly entered the mold and that suitable bottles were produced therefrom.

EXAMPLE 2

The procedure of Example 1 was repeated with the exception that gobs were sprayed at 10 minute intervals with 13 gobs being sprayed during each spray interval. Satisfactory bottles were again produced.

EXAMPLE 3

The lubricating method of the present invention was also employed to lubricate a 13 ounce gob of amber glass that was subsequently formed into a 16 ounce capacity bottle. The bottles were produced at a rate of 49 bottles per minute on a six section, single gob, I.S. glass forming machine machine (7.3 second machine cycle). The gobs were directed through a funnel, and passed through graphite-laden flames from four burners which were directed into the funnel to coat the gob as the gob passed through the funnel as depicted in FIGS. 5 and 6. The burner employed had an I.D. of 1 inch, with the maximum diameter of the funnel being 4 inches and the length of the funnel being 8 inches.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. In a method for the production of glass articles wherein viscous glass in the form of glass gobs or parisons is provided, caused to be placed in a mold of suitable configuration and permitted to cool to form a glass article, the improvement comprising applying a lubricant to the surface of said viscous glass prior to entry of said viscous glass in said mold.

2. The method of claim 1 wherein said lubricant comprises a solid lubricant.

3. The method of claim 2 wherein said lubricant comprises powdered graphite.

4. The method of claim 1 wherein said lubricant is sprayed onto said viscous glass.

5. The method of claim 4 wherein said lubricant is sprayed onto said viscous glass by being fed into the combustion gas for a flame which flame contacts said glass prior to its entry into the mold.

6. The method of claim 1 wherein said lubricant is applied to said viscous glass in an amount of from about 0.05 milligrams/cm$^2$ to about 2.15 grams/cm$^2$.

7. The method of claim 6 wherein said lubricant is applied to said viscous glass in an amount of about 0.3 milligrams/cm$^2$.

8. The method of claim 1 wherein said lubricant is sprayed onto said viscous glass subsequent to being electrostatically charged by passage between electrodes.

9. In a method for the production of glass articles wherein a plurality of viscous glass gobs are provided, caused to be placed in a mold of suitable configuration are permitted to cool to form a glass article, the improvement comprising coating at least a portion of said plurality of glass gobs prior to entry thereof in said mold by causing at least a portion of said plurality of glass gobs to pass through at least one flame having entrained therein a particulate lubricant whereupon said lubricant adheres to said gobs.

10. The method of claim 9 wherein said lubricant comprises graphite.

11. The method of claim 9 wherein said lubricant is applied to said gobs in an amount of from about 0.05 milligrams/cm$^2$ to about 2.15 grams/cm$^2$.

12. The method of claim 11 wherein said lubricant is applied to said gobs in an amount of about 0.3 milligrams/cm$^2$.

13. The method of claim 9 wherein said lubricant is applied intermittently such that only a portion of said glass gobs which are placed in said mold are lubricated.

14. In a method for the production of glass articles wherein viscous glass in the form of glass gobs is provided and directed to a mold of suitable configuration by delivery equipment, the improvement comprising lubricating the glass prior to contact with said delivery equipment by applying a lubricant to the surface of said viscous glass prior to said contact.

15. The method of claim 14 wherein said lubricant comprises a solid lubricant.

16. The method of claim 15 wherein said lubricant comprises powdered graphite.

17. The method of claim 14 wherein said lubricant is sprayed onto said viscous glass.

18. The method of claim 17 wherein said lubricant is sprayed onto said viscous glass by being fed into the combustion gas for a flame which flame contacts said glass prior to its contacting said delivery equipment.

19. The method of claim 14 wherein said lubricant is applied to said viscous glass in an amount of from about 0.05 milligrams/cm$^2$ to about 2.15 grams/cm$^2$.

20. The method of claim 19 wherein said lubricant is applied to said viscous glass in an amount of about 0.3 milligrams/cm$^2$.

21. The method of claim 14 wherein said lubricant is sprayed onto said viscous glass subsequent to being electrostatically charged by passage between electrodes.

22. The method of claim 14 wherein said delivery equipment is selected from the group consisting of chutes, funnels and belts.

23. The method of claim 14 wherein said lubricant is applied intermittently such that only a portion of said surface of said viscous glass is lubricated.

* * * * *